Aug. 9, 1966  D. SCARAMUCCI  3,265,399
REMOTE CONTROL HYDRAULIC LINE STRIPPER
Original Filed Oct. 31, 1960  2 Sheets-Sheet 2
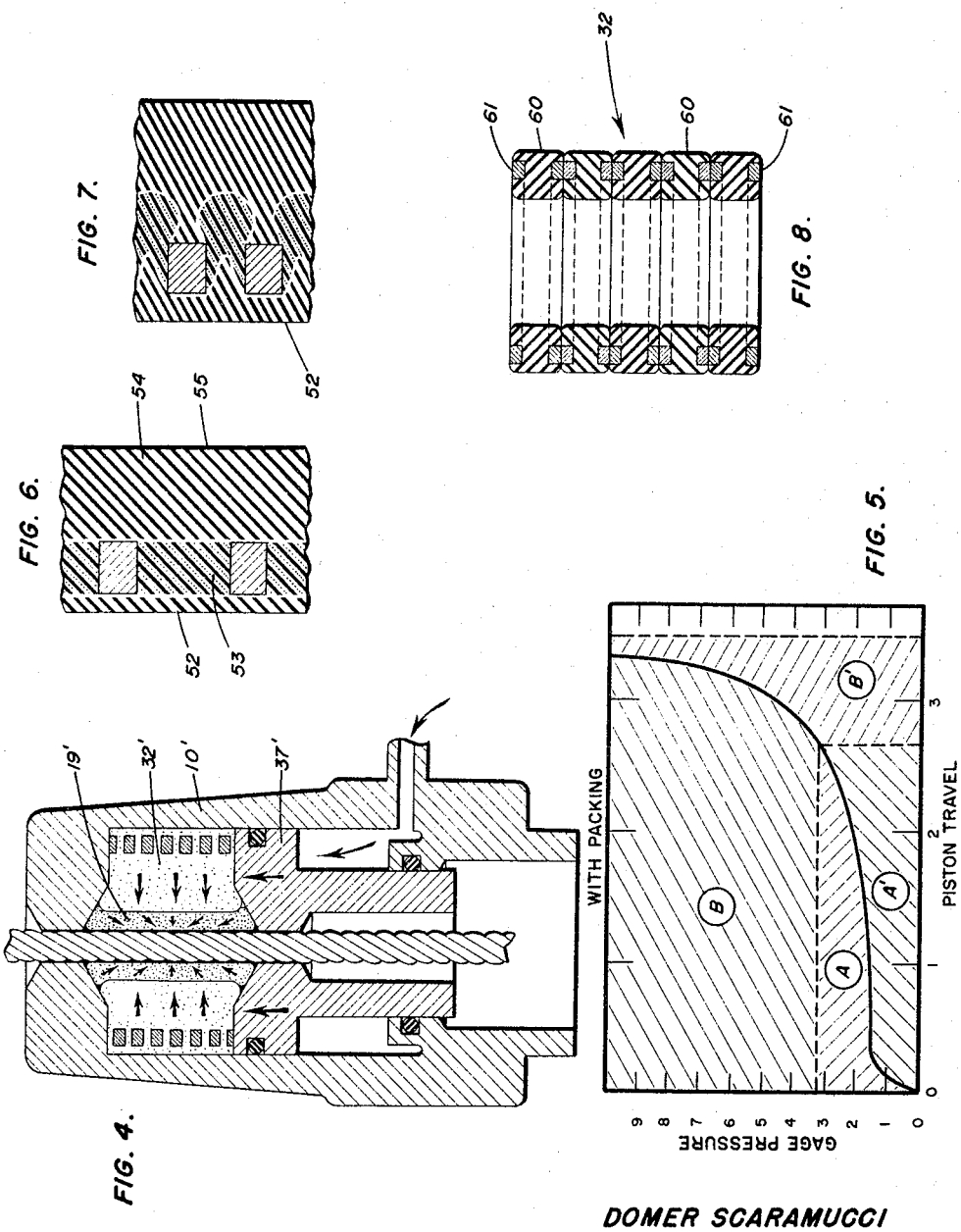
DOMER SCARAMUCCI
INVENTOR

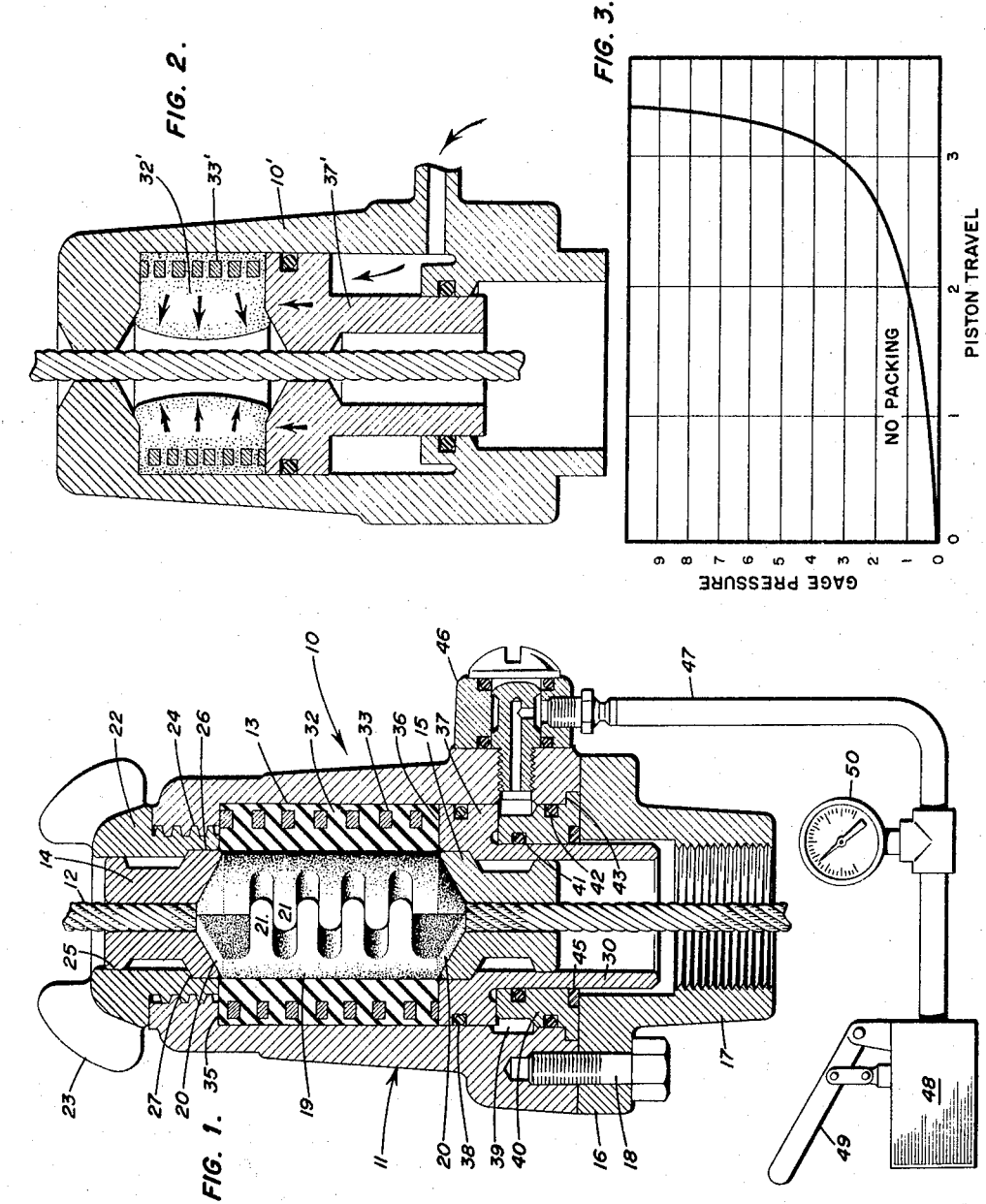

3,265,399
REMOTE CONTROL HYDRAULIC LINE STRIPPER
Domer Scaramucci, P.O. Box 9125, Oklahoma City, Okla.
Original application Oct. 31, 1960, Ser. No. 66,301, now Patent No. 3,132,867, dated May 12, 1964. Divided and this application Mar. 24, 1964, Ser. No. 354,373
9 Claims. (Cl. 277—198)

This is a division of applicant's copending application of the same title filed October 31, 1960, Serial No. 66,301 now Patent No. 3,132,867.

The present invention relates to remote control line-strippers constituting an improvement on manually operated devices heretofore known in the oil field vernacular as oil savers.

The present more accurate title used herein defines apparatus for the operation of wiping or stripping from a stranded steel cable or "wire line" the mixture of several of the undesired materials which may be found in the well pipe of a gas or oil well when it is being swabbed or cleaned for the purpose of removing impediments to free-flow through the pipe. Among those materials may be found heavy oil, sand, paraffin, mud and the like which if allowed to be withdrawn onto the table, carrying the cleaning tools, swabs, balers and so forth, would be distributed widely over the upper platform of the derrick, would be sprayed from the whipping cable and drip from the drum of the power operated winch winding the cable and would create a dangerous working area and damage adjacent property. The stripper or oil saver wipes any and all of these materials from the surface of the line as it is withdrawn from the upper end of the well pipe and forces them to drip back into the pipe where they are lifted by the swab, baler or the like and drawn off harmlessly through a suitable lateral pipe.

The wiping material or packing which strips the mixture from the wire surface is rapidly eroded and worn away by its abrasive nature and must be replaced often to be effective. Moreover, it is required to be kept under considerable compression to properly contact the surface of the stranded line and occasional adjustments are required to compensate for wear during a single run which could involve a line of a mile or more in length. In addition, the usual procedure is to allow the line to run back into the well pipe with the packing freed from it to eliminate wear when no wiping or sealing is required.

To carry out these various operations the older type of stripper constructions provide for manual manipulation at the well head for making the adjustments, and relaxing the pressure when the line is returned, but the present disclosure deals with the remote controlled, hydraulically-operated construction to which the industry is rapidly turning. This is demanded because the present day, high-speed, line spooling well-servicing equipment makes it extremely dangerous for personnel to operate line strippers at the well head. During cable travel any mishap in line-spooling may result in slack and whipping of the line which might cause accidents and injury to personnel.

It is, therefore, a general object of the present invention to provide a novel and improved, remote controlled hydraulically actuated line-stripper capable of making and indicating the adjustment of the wiper or packing and effecting relaxation thereof when returning the line to the well, all without immediate presence of the operator.

More particularly, it is an object of the invention to provide, in a remote-control, hydraulic line-stripper, means for compressing the packing hydraulically in such a manner that the condition thereof may be indicated at a remote control position whereby the operator is always apprized of the compression pressure on the wiper or packing material without approaching the dangerous well head during operation.

In addition to knowing the pressure exerted on the packing to compress it about the wire line, the operator must be aware of the packing condition and the quantity of it remaining at all times so that he can elect, at the end of a run from downhole, whether to make a packing change while the line and tools are at the well head and above the shut-off gate or to chance using the packing for an additional run. If the packing is dissipated during the course of an up trip it necessitates continuing drawing the cable out of the well with fluid spraying from a leaky stripper, making it dangerous to personnel and damaging to property.

It is therefore another object of the present invention to provide means discernible at a remote position to indicate the quantity of packing remaining in the stripper by an appropriate measure of the hose pressure delivering hydraulic fluid to the packing compressing mechanism.

Since many wells are swabbed, treated and otherwise require a wire line to be run down into them, while under pressure, sometimes very high from internal conditions, it is extremely important that the well packing not wear to a point of uselessness during a round trip of the swab or other device on the wire line for otherwise the trip must be completed under dangerous conditions of leakage. The pressure used to compress the packing is alone insufficient indication of the packing condition in earlier constructions, since the compressor loading demands on the packing vary considerably during the well swabbing or other operation, and which may be due to changing conditions in the well in the way of pressures and varying compositions of the well fluids so as to create different and rapidly varying demands on the loading of the packing. Thus, at the start of swabbing operations the tubing is loaded with heavy mud or oil, such that well-head pressure is negligible and thus requires only low compressive demands on the packing for clean wiping. Then salt or acid water may enter the well pipe while the well head pressure remains, low increased loading on the packing is, however, necessary to properly strip the lines of these harmful substances. Then as formation oil, along with gas starts coming in, the well head pressure rises and requires greatly increased compressive loading on the packing.

The above enumerated and other changes in well conditions rarely occur suddenly, but rather merge with each other as various mixtures of incoming fluids are encountered. In general, the operator is ordinarily unaware of the nature of the fluid during a swabbing trip, nor does he know just what factor is creating the increased demand on the packing to seal off and clean the line for quite often the compresive demand on the packing drops off while swabbing the well. All of these and other factors make it extremely difficult to make use of gauge readings as a measure of packing condition since such gauge readings are only a rough indication at best, of the packing compressor piston position, such that visual operation at the stripper is necessary.

Efforts have been made to use springs sufficiently strong to override and cancel out the packing compressive loading range so that the packing load factor would be negligible. This is an impractical solution, however, for in the first place a coil spring ploted load versus deflection provides a straight line curve and exceedingly accurate gauge would be necessary to establish the point of packing change requirement, and, in the second place, the resistance created by the spring of sufficient strength to override the packing loading would result in such high pump pressures and pumping demands on the operator as to be undesirable. Moreover, the spring would have to be of such large dimensions as to produce a stripper of exaggerated size undesirable to the trade. For these reasons, springs now used in strippers are purposely of low load and rate characteristics and only sufficiently strong to return the piston to its no-load position.

Still another object of the invention includes the provision of means for indicating packing wear at a remote control point whereby it is possible, for all practical purposes, to correlate piston travel and in turn, packing wear, at the pump with or without a gauge because of a novel construction which creates a remarkable reaction to operation of the hand pump, wherein the curve between gauge pressure and packing compressor piston travel is substantially horizontal over a long range of piston travel and then abruptly rises very steeply, the abrupt change indicating either on the gauge or to the operator of the hand pump that the maximum usage of the packing has been achieved while yet permitting the finishing of the run of the wire without loss of stripping action.

More specifically it is an object of the invention to provide in an hydraulic remote control wire line oil stripper, a specific combination of packing or wiper and separate contracting sleeve therefor, used along with a piston moving axially of the wire to compress both the packing and contracting sleeve longitudinally thereby the packing is constrained to move radially inwardly to maintain its contact with the wire as wear occurs.

Another important specific object of the invention comprises the incorporation in the contracting sleeve and near its outer periphery of a helical spring, or separate washers, of substantially rectangular wire cross-section, adapted, when compressed, to squeeze the material of the sleeve radially inwardly as its length is shortened so as to provide a substantially uniform compression of the packing throughout the length without a substantial increase in the amount of pressure required to compress the sleeve longitudinally until the convolutions of the spring, or the washer faces, approach closely to each other at which time the pressure required for further movement increases abruptly.

Another important feature of the invention resides in the incorporation of the rectangular section reinforcing convolutions near the outer periphery of the contracting sleeve and bonding them closely to the material of the sleeve to improve the action during compression.

Still another feature of the invention resides in the construction whereby a packing of minimum length is used, i.e., only the necessary length to provide the proper seal with the wire and to support itself plus a small additional length to accommodate a shortened hydraulic piston stroke, and wherein the main reserve mass of packing material can be stored in an increased diameter whereby to be displaced laterally inwardly by the contracting sleeve which itself is compressed end to end.

Another important feature of the invention comprises the arrangement of the contracting sleeve whereby it can never be displaced sufficiently far toward the wire to be contacted by the same and damaged.

Still another important object of the invention is to so arrange the relationship of the contracting sleeve and the hydraulic piston as to seal off and protect the large piston-to-body bearing area from corrosion and abrasion due to sand, acids and other materials entrained in the well fluids. As a corollary to this the piston assembly incorporates a separate floating gland leaving it free to align perfectly with the reciprocating piston member and which provides a chamber in its outer periphery to accumulate foreign matter which may be entrained in the fluid used to operate the stripper.

Other and further features and objects of the invention will be more apparent to those skilled in the art upon a consideration of the accompanying drawings and the following specification wherein are disclosed several exemplary embodiments of the invention with the understanding that such changes and modifications may be made therein as fall within the scope of the appended claims without departing from the spirit of the invention.

In said drawings:

FIGURE 1 is a longitudinal central section through a preferred embodiment of the invention shown connected in a hydraulic operating system;

FIGURE 2 is a simplified embodiment of the invention primarily for illustrative purposes and showing the action of the contracting sleeve with its built-in spring at the end of the piston stroke and with the packing removed;

FIGURE 3 is a graph illustrating the relationship between gauge pressure and piston travel in the arrangement illustrated in FIGURE 2;

FIGURE 4 is a view similar to FIGURE 2 but showing the packing in position and reduced to its minimum amount by wear;

FIGURE 5 is a graph similar to FIGURE 3 but illustrating the operation of the completed assembly of FIGURES 1 and 4;

FIGURE 6 is an enlarged view in longitudinal radial section through one side of the contracting sleeve containing the helical spring in its relaxed position;

FIGURE 7 is a view similar to FIGURE 6 but showing the spring in its substantially maximum compressed position these views being on an enlarged scale and demonstrating by different illustrative characteristics the compression effect of the spring on different areas of elastic material; and FIGURE 8 is a longitudinal central section through a complete contracting sleeve assembly using separate metal washers and elastic rings, and alternatively usable in lieu of the construction illustrated in the earlier figures.

Referring now to the drawings and first to FIGURE 1, for a better understanding of the present invention, there is shown at 10 a suitable metal housing or shell of two-piece construction and of generally cylindrical shape. It forms the main portion of the hydraulic line-stripper 11 shown in position over a steel wire line or cable 12 extending axially through the central cylindrical bore 13 of the housing. The line is guided and centralized in the large bore by means of upper and lower bushings 14 and 15, respectively, of a suitable non-sparking metal each having a central axial bore to loosely guide the cable as it is being drawn from the well pipe (not shown) on the upper end of which the housing is mounted by means of the screw threaded extension 17 of the separable flange section 16 secured to the main body of the housing along a plane at right angles to the axis of the cable and flanged for the reception of attaching studs 18, as shown.

The cable is closely engaged by the walls of the central passage through a cylindrical packing or wiping member 19 positioned in the cylindrical bore in the housing and well spaced from the walls thereof. This packing is shown as having conical ends 20 each cooperating with a conical depression in the facing end of one of the bushings 14 or 15. It is more specifically illustrated and described in my allowed application, Serial No. 723,332, filed March 24, 1958, now Patent No. 2,968,505, dated January 17, 1961, and entitled "Long Life Cylindrical Packing for Oil Savers and the Like Devices." Such a packing is longitudinally separable along a sinuous line indicated by the interlocking fingers tapered in thickness illustrated at 21 so that it may be opened and placed around a cable or wire line intermediate the ends thereof when replacement is required. Moreover, as pointed out in the above identified specification, the central bore of the wiper may be made to continuously engage about the circumference of the wire as wear progresses by radial compression of the wiper, for the fingers continue to move inwardly over each other until the packing is substantially completely worn out. This avoids any severe distortion and stressing of any parts of the rubber-like composition which would render it susceptible to disintegration if cut or nicked as, for instance, by the scarifying action of sand particles being drawn up on the surface of the wire.

Rubber-like materials including natural and artificial rubbers, when highly stressed, are damaged quite readily when the mass is subjected to undue stress created by distortion, but, otherwise rubber and its substitutes has remarkable abrasive resistant properties even under direct compression. Cutting or abrasion, however, when under highly stressed conditions causing distortion is followed by extended fracture and breakdown which is very serious in wire line wipers since the small chucks thus formed are granulated and drawn out of the housing by the cable, thus quickly depleting the packing. Such action is augmented by broken strands occurring often in wire lines and referred to in the vernacular as "wickers" which present a severe cutting problem when packing is unduly distorted and stressed.

To facilitate packing or wiper replacement the upper end of housing 10 is closed by a plug follower 22 provided with wings 23 to facilitate its removal manually and is externally threaded to be received in the threaded opening 24 in the upper end of the housing and having a diameter substantially greater than that of the bushing 14 but not as great as the bore 13. This backing follower is bored to receive the intermediate diameter 25 of the bushing and is counterbored at 26 to receive the largest diameter, near the conical indentation, and this forms a shoulder 27 whereby the plug presses down on the bushing to thereby hold the packing against the lower bushing which fits within a sleeve 30 bored the same as the plug just described and for the same purpose. Suitable confronting annular surfaces on the plug and housing limit the entry of the plug 22 into the cylinder whereby it is prevented from compressing the packing.

The space between the cylindrical outer surface of packing, 19, when in its relaxed initial condition, and bore 13 of the housing is closely filled by an annular, contracting sleeve 32 formed of a rubber-like material in which is embedded near its outer periphery a helical spring 33 of steel or the like with its convolutions spaced apart a distance somewhat greater than their thickness measured in an axial direction. The wire from which the spring is coiled is preferably rectangular in cross-section, as seen, or at least has flat top and bottom faces for purposes which will be later described. The rubber-like material of the sleeve is securely bonded to all surfaces of the spring and, thus, the latter serves to retain and control the inner shape of the sleeve during its compression longitudinally by means now about to be described. As clearly shown the amount of resilient material inside of the spring is much greater than that between its outer surface and the bore of the housing.

It will be appreciated that when the annular sleeve 32 is longitudinally compressed the rubber-like material thereof can move only inwardly since the outer periphery is slidably engaged against the bore 13 of the housing, the upper end of the sleeve abuts the shoulder 35 at the upper end of the bore 13 as well as the lower end of the plug 14, while the lower end of the sleeve abuts against the flat annular face 36 of the piston 37 which is integral with sleeve 30, previously referred to, and has a diameter to provide a close working fit in the bore 13 of the housing. The length of this bore is such as to receive both the sleeve and the piston 37 as shown. A suitable packing such as O-ring 38 in an annular groove about the periphery of the piston assures a fluid-tight fit so that hydraulic pressure applied into the annular channel 39, by means later to be described, and acting against the under face of the piston, may lift it to longitudinally compress the contracting sleeve 32.

The piston skirt or sleeve 30 within which is housed the lower bushing 15 has a cylindrical external surface less than that of the piston, and has a close working fit with the inner bore of gland member 40 which serves to guide the piston and maintain its alignment with the cylinder axis. The gland carriers internally an O-ring 41 to prevent loss of hydraulic liquid between its bore and the surface of sleeve 30 and its outer surface is channeled to receive O-ring 42 to form a fluid-tight connection with the lower extension of bore 13 below channel 39. Finally the lower portion of the gland is flanged as at 43 to be received in a counterbore at the lower end of housing 10 to hold it clamped between the bottom of this counterbore and the upper face of the flange section 16 of the housing. The channel about the inner periphery of the lower face of the gland 40 receives a wiper ring 45 whose inner periphery closely engages the outer surface of sleeve 30 to wipe it clean as the piston advances so that any contaminants in the fluid in the well pipe are kept from the metal-to-metal sliding surface between the bore of the gland and the outer face of skirt 30.

Pressured hydraulic fluid for moving the piston upwardly is conducted into channel 39 by way of swivel fitting 46 to which high-pressure flexible hose 47 is coupled as shown leading to the manually operable positive displacement pump 48 having the operating handle 49. A suitable pressure gauge 50 may be connected into hose 47 adjacent the pump and since neither accuracy nor specific pressures need be indicated thereby it can be a relatively low cost affair arbitrarily calibrated in any desired units.

For a better understanding of the operation of the device of FIGURE 1 reference should be had now to FIGURE 2, first considering that in present day high speed spooling, where the wire line travel is often in excess of five hundred feet per minute, severe problems are presented in the design of strippers and packing. Heat due to friction as generated by the fast moving line against a compressed rubber packing causes rapid deterioration and fatigue of this structure and the condition is greatly aggravated by any distortion or stress imposed on the packing member during displacement of the reserve rubber therein, which is to replace that subsequently worn away. This distortion in prior forms of solid packing is the result of the manner of displacement of the reserve packing toward the wire line to make up for wear. In the packing as shown at 19 in FIGURE 1, however, adapted to be collapsed and drawn about the line, only bending stresses are imparted to the material and these result in internal compression only, even when the material must be severely bent to maintain the wall of the continually enlarging hole in contact with the line to properly seal off and strip the latter. The advantages of applicant's construction is derived from the inter-leaving of the fingers of the packing so that most of the distortion is pure bending stress, wrapping the packing further about the line.

This result is achieved in the manner of FIGURE 2 which illustrates a rudimentary form of housing 10' having the piston 37 therein movable upwardly, as in the embodiment of FIGURE 1, by fluid pressure to shorten the sleeve 32', with the built-in spring 33' exactly as in FIGURE 1, but the embodiment is illustrated in the absence of packing and with the piston at its maximum extension. The elastic material of the sleeve has been substantially shortened and as a result has been distended inwardly very nearly uniformly in amount throughout the length of the sleeve in its contracted form. There is a slight curvature to the inner walls, which might be said to be of the hour glass type but not so exaggerated, so that most of the material of the packing, were it in position, would be very uniformly compressed toward the wire.

Were the packing in position as in FIGURE 4 this bowing of the inner surface of the compressible sleeve would be resisted, as shown, and the pressure on the packing would be fairly uniformly inwardly as illustrated by the arrows in the remnant of packing 19'. It must be appreciated that as the piston moves upwardly to compress the contracting sleeve it also shortens the packing. The conical packing ends and the corresponding surfaces of the bushings 14 and 15 plus the inward radial pressures exerted on the packing by the expanding sleeve causes the ends of the packing to slide inwardly along the conical surfaces to reduce any distortion at the ends, except what little exists at the "rivet-head" shaped portions where the elastic material of the sleeve follows into the end depressions vacated by the packing material as it wears.

The situation illustrated in FIGURES 2 and 4 is identical insofar as the piston position is concerned but the differences in the shapes of the sleeves comes from the presence of and absence of the packing. As shown in FIGURE 4 the packing has reached about its limit of wear, and because of the small amounts of elastic material remaining between the flat faces of the embedded spring turns the resistance to movement of the piston has begun to increase rapidly. There is, however, adequate packing material remaining, following an indication to the operator by the greater resistance to movement of the pump handle and the increase on the gauge, to permit finishing the run of the wire without damage or escaping liquid. Because of the uniformity of the compression of the packing material none is overstressed and subject to cutting or tearing and there is no likelihood of it crumbling and small pieces being drawn out between the wire and the upper end guide which would rapidly deplete the packing and leave the wire travelling with no wiping action for it. Should, however, any unusual circumstances, such as a faulty composition of the packing cause it to be entirely depleted the spring included in the contracting sleeve will prevent shortening the sleeve sufficiently to bring the material thereof dangerously close to the travelling wire where it might be abraded.

Reverting now to FIGURE 3 which is a graph between gauge pressure and piston travel of the arrangement illustrated in FIGURE 2 with the absence of packing, where it will be noticed that for the first three units of piston travel there is only a very gradual increase from "zero" in the gauge pressure. The initial start is from "zero" because there is no resistance other than the relatively low initial effort required to compress the elastic material of the sleeve. However, as the convolutions of the spring approach each other to the position illustrated in FIGURE 2 it becomes increasingly difficult to force the elastic material out from between them and the curve rises steeply as shown starting at position 3 of the piston in FIGURE 3. This abrupt transition is immediately apparent not only on the gauge, but by the resistance to pumping which can readily be felt by an experienced operator who need not even look at the gauge. There yet remains, however, the possibility of sufficient further contraction of the sleeve to use up the last worthwhile portion of packing, when it reaches the condition illustrated in FIGURE 4, for the finish of a run after which, of course, new packing must be substituted, which can be quickly done by removing the winged plug, pulling out the old packing and replacing with new.

Turning now to FIGURE 5, which is a graph of the operational characteristics of the embodiment of FIGURE 4 with the packing in position, it will be seen that, starting with zero pressure and piston travel, the curve moves upwardly steeply from zero as the resistance of the packing to compression against the wire is met, but thereafter the operator by occasional pumping can maintain the material of the packing in close engagement with the wire with no greater steepness occurring in the curve than in the showing in FIGURE 3, until substantially the same position is reached as in that figure when the curve moves up with about the same abruptness.

FIGURES 3 and 5 show the result of placing the spring purposely near the outer periphery of the sleeve member and bonding it to the material thereof to provide a substantial mass of less restrained rubber toward the inner diameter of the sleeve. As the bonded sections occur all along the sleeve length the lateral distribution of the displaced rubber mass is held substantially uniform as best emphasized in FIGURE 2, such that a greater mass can be displaced before actual sleeve contact at some point with the line is imminent.

In this condition illustrated in FIGURE 4, when the packing has reached nearly the condition of maximum allowable travel for safe packing wear, there is still, for all practical purposes, sufficient packing material in properly supported form to avoid extrusion and "chunking out" and, thus, total loss of packing. In the arrangement illustrated in FIGURES 4 and 5 the prime object of applicant's disclosure is best illustrated for the novel characteristics of the sleeve and spring combination in providing positive means for indicating packing wear, as shown, without need for exposing piston members or other indicators at the stripper for visual inspection as in the prior art, and it also becomes apparent that a gauge is not essential for operation, as previously mentioned.

It is well to remember that the unit loading and deflection rate in a steel spring may, for all practical purposes, be considered to have a straight-line characteristic throughout its range of deflection. Rubber, unlike steel, has its strain and stress not proportional, and it is not until stress due to elongation approaches ultimate rupture that the distinction becomes most apparent. The curves in FIGURES 3 and 5 are the result of enclosing the spring in the elastic sleeve but the curves themselves are independent of the spring and, therefore, as they approach near the end of the piston stroke they deviate sharply from the curve that would be the result of using a plain rubber sleeve. Tests have shown that this reaction is much less pronounced when the spring is not bonded to the rubber. A non-bonded combination also affords limited restraint against bulging in and acting too much like a plain rubber sleeve.

In the graph of FIGURE 5 the compression pressures substantially between the gauge points 1 and 2 are required to seal the packing against the line and during the major portion of the piston travel and effective packing wear life (area A'), the gauge pressure rise (area A), shows only a slight increase, such that the curve is much like the example in FIGURE 3.

On the other hand the remaining piston travel and packing wear life (area B') which in design is controlled to allow the operator a few more piston strokes, depending on depth and well conditions, reflects a marked change in gauge pressure rise (area B) of several times the normal operating pressure demand at the pump. It is important that the pressure requirements, going along on a fairly flat curve, then veering to a sharply vertical curve, are not due to additional stress or compression applied to the packing, but are due to stresses inherent to the contracting sleeve when in the compressed relation shown in FIGURE 4.

Thus, in actual practice the varying pressure demand for compression of the packing, as created by well conditions mentioned earlier, when super-imposed along the flat portion of the curve, are insignificant factors, as compared to the guage-indicated increasing pressure demand imposed by the contracting sleeve during that critical wear portion of the packing life best illustrated in FIGURE 4. The change is so pronounced that in actual practice the operator can and prefers to rely on a sense of feel at the hand pump, as a more reliable indication of packing condition, since the ever fluctuating gauge often presents a confusing picture. During wire line trips along the flat portion of the curve, operation of the pump is easy and almost effortless, but as critical wear is approached the operator begins to sense an increasingly sharp rise in torque and effort demand, so as to provide unmistakable evidence of piston position and packing life condition.

In earlier development work a round wire spring was tried and found entirely satisfactory for controlling the inner displacement of the rubber sleeve to avoid excessive bulging in. However, near end compression such sleeve lacks the property of providing critical packing wear tolerance before the stress in rubber between coils caused ultimate rupture. Thus, after a few reversals the rubber cushion between coils cut through and the sleeve then tended to produce a fairly flat curve up to the full closure of the spring. The reaction produced is much like that of a plain rubber sleeve and spring separately installed on the piston. In other words, it lacked the quality of providing the critical wear forewarning feature needed before the piston was completely halted by full spring closure.

In order to avoid fracture between coils, sleeves using square and rectangular wire forms were tested and it was found that either form, of proper cross-section, provides the necessary bearing area between coils so that when fully compressed to maximum pumping limits and the coil spacings approach as close as one-sixteenth of an inch or less, fatigue and fracture of the elastic materials did not occur. Equally important, it was now evident that the sleeve contained a cushioning and stress producing quality necessary for critical wear range indication as well as operating allowance for packing change decisions.

Other factors tending to control the rate of change in the curve included the volume of rubber so disposed as to provide effective displacement of the packing in order to achieve optimum performance.

It is extremely difficult to determine and picture the actual stress arrangement in the sleeve when compressed, but tests with springs of various coil spacings and variously positioned within the sleeve showed that a condition such as reflected in FIGURES 6 and 7 is approximately accurate. Here the rubber or elastic mass is pictured in different forms of cross-hatching solely for purposes of illustration for it is homogeneous throughout the sleeve. The elastic material outside of the spring is indicated by the coarse cross-hatching 52. It is bonded to the outside of the coil. The portion illustrated with hatching and intermediate dotted lines is spaced between and bonded to adjacent coils and shown in the relaxed position in FIGURE 6, while the portion 54 with the relatively wide spaced cross-hatching is bonded to the inner faces of the spring convolutions and is arranged wholly on the inner side of the coils. The line 55 is its inside cylindrical surface for engaging the cylinder of packing.

FIGURE 7 illustrates the sleeve member in a state of compression, approaching the maximum, with the rubber mass displaced and stressed inwardly within the sleeve, it being assumed that the sleeve is in a confining tube as the housing 10 shown in FIGURE 1.

It is clear then that the rubber 54 must be of such section as to afford more original mass to undergo substantial displacement without undue stressing at its bonded sections which serve to restrain and retain the proper contour within the sleeve. It also is seen that the section 52 need be the least in volume. The rubber 54 does not serve in high stress or provide added resistance to piston pressure requirements, above that necessary to compress it longitudinally, but on the other hand the areas which are between 52 and 53 do not act to cushion, and, when near coil closure tend to produce the pronounced pump reaction heretofore described.

Through proper selection of wire form, coil spacing, position of the spring within the sleeve and the proper positioning of the resilient material with respect to the manner it is intended to function, it becomes feasible to design the sleeve so that it produces the long, flat, low resistance to load qualities, followed by an operable allowance range and finally results in effectively halting piston travel without incurring break-down in the resilient packing mass, even though the sleeve is subjected to maximum output of the pressuring pump.

FIGURE 6 illustrates the preferred form of contracting sleeve for producing the required results and one best suited for economical molding and production, but an alternative construction has been shown in FIGURE 8 which has been tested and found to produce results substantially equivalent to that of the FIGURE 6 embodiment and in this instance the spring has been replaced by independent metal closed rings. To facilitate the spacing of the rings during the molding operation the sleeve assembly is composed of separate segments. Thus, the whole sleeve 32' in FIGURE 8 is composed of annuli 60, all alike and each molded with a metal ring 61 embedded flush in each flat face thereof and positioned inwardly from the outer edge somewhat in the manner of the arrangement in FIGURE 6. These rings are rectangular in cross-section of about the same ratio of width to height as in the spring form, and, sleeves of varying heights may be built up by merely stacking the annuli one above the other as illustrated.

In the preferred construction of FIGURE 1, the packing design is such that its length is approximately twice its diameter and the piston stroke one-half the packing length so that the piston serves to displace only one-half of the packing length in its operation whereby the terminal one-half remains in sealing engagement and retains sufficient length and strength to provide support against chunking.

The cylinder sleeve member 32 is approximately the length of the packing and the cross-sectional volume of the resilient material is nearly equal to the volume of the packing. Thus, when compressed one-half its length by the piston as the packing is likewise shortened, the sleeve material is displaced by one-half its volume inwardly to displace the remaining one-half volume of packing.

In a design found entirely satisfactory the packing length is four inches and the diameter two inches providing a total volume of about 12 inches and the piston stroke will be two inches. Thus, the piston acting alone serves to displace one-half or six cubic inches of packing leaving a total of six inches. In this design the sleeve is made the length of the packing, 4 inches, and its outer diameter provides a cross-sectional area corresponding to that of the packing, such that its volume is 12 cubic inches. The piston compresses the sleeve two inches before stopped by the metal inserts and it too displaces six cubic inches. Here, however, it serves to displace most of the remaining six cubic inches of packing material in lateral thrust fashion, such that, without loss of packing support through the extended stroke of the piston, or undue stressing of the packing it can be fully or substantially fully dissipated. Of course, in actual design and for safety the sleeve volume or stroke or both is purposely calculated to avoid complete dissipation of the packing.

The combination of correlated end to end and inwardly directed lateral thrust displacement packing chamber construction together with a proportionally dimensioned and coacting packing member provides an overall combination such that optimum sealing efficiency and packing wear life is realized.

It is to be noted that the positioning of the contracting sleeve 32 is such as to seal off and protect the large piston-to-body sliding area from corrosion and abrasion due to acids and sand entrained in the well fluid. The chamber 39 formed outside of the gland 40 will accumulate any foreign matter entrained in the operating fluid.

Where operating conditions are not so severe and where cost is a major factor it is possible to obtain reasonably effective results using a plain rubber contracting sleeve rather than one having the spring or rings embedded therein. The packing, however, must be of the construction illustrated in FIGURE 1 to realize most of the benefits of the present invention. It must be recognized, however, that such an arrangement requires the provision of visual means to indicate packing wear and some stop means must be provided to limit piston travel to prevent sleeve contact with the line.

I claim:

1. For use in a stripper for wire lines, the combination of a compressor and a cylindrical packing member, said compressor comprising an annulus of elastic, rubber-like material sized internally to closely engage the outer surface of the packing member and of substantially the same length, a plurality of turns of wire of a substantially rectangular cross-section embedded in said material and extending closer to the outer wall of the annulus than the inner one, the turns being of uniform diameter and spaced apart axially of the annulus a distance at least as great as the axial thickness of a turn, whereby to extrude the elastic material between the wire turns radially inwardly of the annulus when the latter is compressed longitudinally to thereby compress the packing member.

2. The combination of claim 1 in which all of said turns of wire are integrated into a helix and all surfaces of the wire of each turn are bonded to the elastic material of the annulus.

3. The combination of claim 1 in which the said annulus is built-up and composed solely of a plurality of similar washers stacked one on the other, each washer having as a core a closed turn of said rectangular wire embedded wholly in said elastic material and at least three of its edges being bonded thereto.

4. For use in a stripper for wire lines, the combination of a compressor and a cylindrical packing member, said compressor comprising an annulus of elastic rubber-like material sized internally to closely engage the outer surface of the packing member and of substantially the same length, a helix of resilient but relatively incompressible material of a cross-section substantially transversely flat top and bottom encased in said elastic material annulus closer to the outer wall thereof than the inner one, the turns of the helix being of uniform diameter and spaced apart axially of the annulus a distance at least as great as the axial thickness of a turn whereby to extrude the elastic material between the turns radially inwardly of the annulus when the latter is compressed longitudinally and restrained laterally to thereby compress the packing member.

5. The combination as defined in claim 4 in which the said turns of the helix each have a cross-section with a larger radial dimension than axial one, and at least the flat tops and bottoms are bonded to the material of the annulus.

6. In combination with a cylindrical packing member, a compressor comprising an annulus of resilient material having a through central opening sized to closely fit the packing member, turns of substantially incompressible material having substantially flat facing surfaces being embedded in said annulus and axially spaced apart a distance greater than the thickness of a turn, said turns being of such internal and external diameters as to be less in radial width than one half the radial thickness of the annulus wall and being positioned closer to the outer wall than to the inner wall of said annulus whereby to extrude the interleaved material inwardly as the annulus is compressed longitudinally.

7. The combination of claim 6 in which said turns are at least partially bonded to the resilient material of the said annulus.

8. The combination of claim 6 in which said turns are integrated into a helical spring formed of a substantially incompressible strip of generally rectangular cross-section.

9. The combination of claim 8 in which each turn is fully bonded to the material of said annulus to control the inward extrusion of the annulus material when compressed longitudinally.

References Cited by the Examiner

UNITED STATES PATENTS

| 1,881,155 | 10/1932 | Weydert | 267—33 |
| 2,258,067 | 10/1941 | Paton | 267—54 |
| 2,385,156 | 9/1945 | Newell | 277—235 X |
| 2,553,750 | 5/1951 | Cole | 277—235 X |
| 2,768,849 | 10/1956 | Riesing | 277—235 X |

FOREIGN PATENTS

| 616,971 | 8/1935 | Germany. |

ARTHUR L. LA POINT, *Primary Examiner.*

EUGENE G. BOTZ, *Examiner.*

R. M. WOHLFARTH, W. B. WILBER,
*Assistant Examiners.*